(12) United States Patent
Lin

(10) Patent No.: US 8,571,346 B2
(45) Date of Patent: Oct. 29, 2013

(54) METHODS AND DEVICES FOR DEFECTIVE PIXEL DETECTION

(75) Inventor: Shang-Hung Lin, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 914 days.

(21) Appl. No.: 11/260,068

(22) Filed: Oct. 26, 2005

(65) Prior Publication Data

US 2007/0091187 A1    Apr. 26, 2007

(51) Int. Cl.
*G06K 9/40* (2006.01)

(52) U.S. Cl.
USPC ........... 382/275; 382/100; 382/254; 382/270; 348/180; 348/187; 348/241; 348/246

(58) Field of Classification Search
USPC .......... 382/100, 149, 254, 270, 275; 348/180, 348/187, 241, 246
See application file for complete search history.

(56) References Cited

U.S. PATENT DOCUMENTS

| | | | |
|---|---|---|---|
| 3,904,818 A * | 9/1975 | Kovac | 348/243 |
| 4,253,120 A | 2/1981 | Levine | |
| 4,646,251 A | 2/1987 | Hayes et al. | |
| 4,685,071 A | 8/1987 | Lee | |
| 4,739,495 A * | 4/1988 | Levine | 348/247 |
| 4,771,470 A | 9/1988 | Geiser et al. | |
| 4,920,428 A * | 4/1990 | Lin et al. | 358/461 |
| 4,987,496 A | 1/1991 | Greivenkamp, Jr. | |
| 5,175,430 A | 12/1992 | Enke et al. | |
| 5,261,029 A | 11/1993 | Abi-Ezzi et al. | |
| 5,305,994 A | 4/1994 | Matsui et al. | |
| 5,387,983 A | 2/1995 | Sugiura et al. | |
| 5,475,430 A | 12/1995 | Hamada et al. | |
| 5,513,016 A | 4/1996 | Inoue | |
| 5,608,824 A | 3/1997 | Shimizu et al. | |
| 5,652,621 A | 7/1997 | Adams, Jr. et al. | |
| 5,793,433 A | 8/1998 | Kim et al. | |
| 5,878,174 A | 3/1999 | Stewart et al. | |
| 5,903,273 A | 5/1999 | Mochizuki et al. | |
| 5,905,530 A | 5/1999 | Yokota et al. | |
| 5,995,109 A | 11/1999 | Goel et al. | |
| 6,016,474 A | 1/2000 | Kim et al. | |
| 6,078,331 A | 6/2000 | Pulli et al. | |
| 6,111,988 A | 8/2000 | Horowitz et al. | |
| 6,118,547 A | 9/2000 | Tanioka | |

(Continued)

FOREIGN PATENT DOCUMENTS

| | | |
|---|---|---|
| CN | 1275870 | 12/2000 |
| EP | 0392565 | 10/1990 |

(Continued)

OTHER PUBLICATIONS

Uomori et al., "Automatic Image Stabilizing System by Full-Digital Signal Processing", vol. 36, No. 3, pp. 510-519, Aug. 1990.

(Continued)

*Primary Examiner* — Eric Rush

(57) ABSTRACT

In a method of image signal processing, defective pixels are determined on-the-fly in a digital image representation based on a comparison of a pixel under evaluation with its surrounding pixels, with reference to a known resolving capability of a lens-sensor arrangement that captured the digital image representation. In response to the determination of defective pixels, the defective pixels are corrected.

21 Claims, 7 Drawing Sheets

(56) References Cited

U.S. PATENT DOCUMENTS

| | | | |
|---|---|---|---|
| 6,141,740 A | 10/2000 | Mahalingaiah et al. | |
| 6,151,457 A | 11/2000 | Kawamoto | |
| 6,175,430 B1 | 1/2001 | Ito | |
| 6,252,611 B1 | 6/2001 | Kondo | |
| 6,256,038 B1 | 7/2001 | Krishnamurthy | |
| 6,281,931 B1 | 8/2001 | Tsao et al. | |
| 6,289,103 B1 | 9/2001 | Sako et al. | |
| 6,314,493 B1 | 11/2001 | Luick | |
| 6,319,682 B1 | 11/2001 | Hochman | |
| 6,323,934 B1 | 11/2001 | Enomoto | |
| 6,392,216 B1 | 5/2002 | Peng-Tan | |
| 6,396,397 B1 | 5/2002 | Bos et al. | |
| 6,438,664 B1 | 8/2002 | McGrath et al. | |
| 6,486,971 B1 | 11/2002 | Kawamoto | |
| 6,504,952 B1 | 1/2003 | Takemura et al. | |
| 6,584,202 B1 | 6/2003 | Montag et al. | |
| 6,594,388 B1 | 7/2003 | Gindele et al. | |
| 6,683,643 B1* | 1/2004 | Takayama et al. | 348/247 |
| 6,707,452 B1 | 3/2004 | Veach | |
| 6,724,423 B1 | 4/2004 | Sudo | |
| 6,724,932 B1 | 4/2004 | Ito | |
| 6,737,625 B2 | 5/2004 | Baharav et al. | |
| 6,760,080 B1 | 7/2004 | Moddel et al. | |
| 6,785,814 B1* | 8/2004 | Usami et al. | 713/176 |
| 6,806,452 B2 | 10/2004 | Bos et al. | |
| 6,839,062 B2 | 1/2005 | Aronson et al. | |
| 6,856,441 B2 | 2/2005 | Zhang et al. | |
| 6,891,543 B2 | 5/2005 | Wyatt | |
| 6,900,836 B2* | 5/2005 | Hamilton, Jr. | 348/241 |
| 6,950,099 B2 | 9/2005 | Stollnitz et al. | |
| 7,009,639 B1 | 3/2006 | Une et al. | |
| 7,015,909 B1 | 3/2006 | Morgan III et al. | |
| 7,023,479 B2 | 4/2006 | Hiramatsu et al. | |
| 7,088,388 B2 | 8/2006 | MacLean et al. | |
| 7,092,018 B1* | 8/2006 | Watanabe | 348/247 |
| 7,106,368 B2 | 9/2006 | Daiku et al. | |
| 7,133,041 B2 | 11/2006 | Kaufman et al. | |
| 7,133,072 B2* | 11/2006 | Harada | 348/243 |
| 7,146,041 B2 | 12/2006 | Takahashi | |
| 7,221,779 B2 | 5/2007 | Kawakami et al. | |
| 7,227,586 B2 | 6/2007 | Finlayson et al. | |
| 7,245,319 B1 | 7/2007 | Enomoto | |
| 7,305,148 B2 | 12/2007 | Spampinato et al. | |
| 7,343,040 B2 | 3/2008 | Chanas et al. | |
| 7,486,844 B2 | 2/2009 | Chang et al. | |
| 7,502,505 B2 | 3/2009 | Malvar et al. | |
| 7,580,070 B2 | 8/2009 | Yanof et al. | |
| 7,626,612 B2 | 12/2009 | John et al. | |
| 7,627,193 B2* | 12/2009 | Alon et al. | 382/275 |
| 7,671,910 B2 | 3/2010 | Lee | |
| 7,728,880 B2 | 6/2010 | Hung et al. | |
| 7,750,956 B2 | 7/2010 | Wloka | |
| 7,817,187 B2 | 10/2010 | Silsby et al. | |
| 7,859,568 B2 | 12/2010 | Shimano et al. | |
| 7,860,382 B2 | 12/2010 | Grip | |
| 7,912,279 B2 | 3/2011 | Hsu et al. | |
| 8,049,789 B2 | 11/2011 | Innocent | |
| 2001/0001234 A1 | 5/2001 | Addy et al. | |
| 2001/0012113 A1 | 8/2001 | Yoshizawa et al. | |
| 2001/0012127 A1 | 8/2001 | Fukuda et al. | |
| 2001/0015821 A1 | 8/2001 | Namizuka et al. | |
| 2001/0019429 A1 | 9/2001 | Oteki et al. | |
| 2001/0021278 A1 | 9/2001 | Fukuda et al. | |
| 2001/0033410 A1 | 10/2001 | Helsel et al. | |
| 2001/0050778 A1 | 12/2001 | Fukuda et al. | |
| 2001/0054126 A1 | 12/2001 | Fukuda et al. | |
| 2002/0012131 A1 | 1/2002 | Oteki et al. | |
| 2002/0015111 A1 | 2/2002 | Harada | |
| 2002/0018244 A1 | 2/2002 | Namizuka et al. | |
| 2002/0027670 A1 | 3/2002 | Takahashi et al. | |
| 2002/0033887 A1 | 3/2002 | Hieda et al. | |
| 2002/0041383 A1 | 4/2002 | Lewis, Jr. et al. | |
| 2002/0044778 A1 | 4/2002 | Suzuki | |
| 2002/0054374 A1 | 5/2002 | Inoue et al. | |
| 2002/0063802 A1 | 5/2002 | Gullichsen et al. | |
| 2002/0105579 A1* | 8/2002 | Levine et al. | 348/187 |
| 2002/0126210 A1 | 9/2002 | Shinohara et al. | |
| 2002/0146136 A1 | 10/2002 | Carter, Jr. | |
| 2002/0149683 A1 | 10/2002 | Post | |
| 2002/0158971 A1 | 10/2002 | Daiku et al. | |
| 2002/0167202 A1 | 11/2002 | Pfalzgraf | |
| 2002/0167602 A1 | 11/2002 | Nguyen | |
| 2002/0191694 A1 | 12/2002 | Ohyama et al. | |
| 2002/0196470 A1 | 12/2002 | Kawamoto et al. | |
| 2003/0035100 A1 | 2/2003 | Dimsdale et al. | |
| 2003/0067461 A1 | 4/2003 | Fletcher et al. | |
| 2003/0122825 A1 | 7/2003 | Kawamoto | |
| 2003/0142222 A1 | 7/2003 | Hordley | |
| 2003/0146975 A1 | 8/2003 | Joung et al. | |
| 2003/0169353 A1 | 9/2003 | Keshet et al. | |
| 2003/0169918 A1 | 9/2003 | Sogawa | |
| 2003/0197701 A1 | 10/2003 | Teodosiadis et al. | |
| 2003/0218672 A1 | 11/2003 | Zhang et al. | |
| 2003/0222995 A1 | 12/2003 | Kaplinsky et al. | |
| 2003/0223007 A1 | 12/2003 | Takane | |
| 2004/0001061 A1 | 1/2004 | Stollnitz et al. | |
| 2004/0001234 A1 | 1/2004 | Curry et al. | |
| 2004/0032516 A1* | 2/2004 | Kakarala | 348/246 |
| 2004/0066970 A1 | 4/2004 | Matsugu | |
| 2004/0100588 A1 | 5/2004 | Hartson et al. | |
| 2004/0101313 A1 | 5/2004 | Akiyama | |
| 2004/0109069 A1 | 6/2004 | Kaplinsky et al. | |
| 2004/0189875 A1 | 9/2004 | Zhai et al. | |
| 2004/0218071 A1 | 11/2004 | Chauville et al. | |
| 2004/0247196 A1 | 12/2004 | Chanas et al. | |
| 2005/0007378 A1 | 1/2005 | Grove | |
| 2005/0007477 A1 | 1/2005 | Ahiska | |
| 2005/0030395 A1 | 2/2005 | Hattori | |
| 2005/0046704 A1 | 3/2005 | Kinoshita | |
| 2005/0099418 A1 | 5/2005 | Cabral et al. | |
| 2005/0175257 A1 | 8/2005 | Kuroki | |
| 2005/0185058 A1 | 8/2005 | Sablak | |
| 2005/0238225 A1 | 10/2005 | Jo et al. | |
| 2005/0243181 A1* | 11/2005 | Castello et al. | 348/222.1 |
| 2005/0248671 A1* | 11/2005 | Schweng | 348/246 |
| 2005/0261849 A1 | 11/2005 | Kochi et al. | |
| 2005/0286097 A1 | 12/2005 | Hung et al. | |
| 2006/0050158 A1 | 3/2006 | Irie | |
| 2006/0061658 A1 | 3/2006 | Faulkner et al. | |
| 2006/0087509 A1 | 4/2006 | Ebert et al. | |
| 2006/0119710 A1 | 6/2006 | Ben-Ezra et al. | |
| 2006/0133697 A1 | 6/2006 | Uvarov et al. | |
| 2006/0176375 A1 | 8/2006 | Hwang et al. | |
| 2006/0197664 A1 | 9/2006 | Zhang et al. | |
| 2006/0274171 A1 | 12/2006 | Wang | |
| 2006/0290794 A1 | 12/2006 | Bergman et al. | |
| 2006/0293089 A1 | 12/2006 | Herberger et al. | |
| 2007/0091188 A1 | 4/2007 | Chen et al. | |
| 2007/0147706 A1 | 6/2007 | Sasaki et al. | |
| 2007/0171288 A1 | 7/2007 | Inoue et al. | |
| 2007/0236770 A1 | 10/2007 | Doherty et al. | |
| 2007/0247532 A1 | 10/2007 | Sasaki | |
| 2007/0285530 A1 | 12/2007 | Kim et al. | |
| 2008/0030587 A1 | 2/2008 | Helbing | |
| 2008/0062164 A1 | 3/2008 | Bassi et al. | |
| 2008/0101690 A1 | 5/2008 | Hsu et al. | |
| 2008/0143844 A1 | 6/2008 | Innocent | |
| 2008/0231726 A1 | 9/2008 | John | |
| 2009/0002517 A1 | 1/2009 | Yokomitsu et al. | |
| 2009/0010539 A1 | 1/2009 | Guarnera et al. | |
| 2009/0116750 A1 | 5/2009 | Lee et al. | |
| 2009/0160957 A1 | 6/2009 | Deng et al. | |
| 2009/0257677 A1 | 10/2009 | Cabral et al. | |
| 2010/0266201 A1 | 10/2010 | Cabral et al. | |

FOREIGN PATENT DOCUMENTS

| | | |
|---|---|---|
| EP | 1449169 | 5/2003 |
| EP | 1378790 | 1/2004 |
| EP | 1447977 | 8/2004 |
| EP | 1550980 | 7/2005 |
| GB | 2045026 | 10/1980 |
| GB | 2363018 | 5/2001 |
| JP | 61-187467 | 8/1986 |

(56) References Cited

FOREIGN PATENT DOCUMENTS

| | | |
|---|---|---|
| JP | 62151978 | 7/1987 |
| JP | 07015631 | 1/1995 |
| JP | 8036640 | 2/1996 |
| JP | 08079622 | 3/1996 |
| JP | 2001052194 | 2/2001 |
| JP | 2002207242 | 7/2002 |
| JP | 2003085542 | 3/2003 |
| JP | 2004221838 | 8/2004 |
| JP | 2005094048 | 4/2005 |
| JP | 2005182785 | 7/2005 |
| JP | 2005520442 | 7/2005 |
| JP | 2006025005 | 1/2006 |
| JP | 2006086822 | 3/2006 |
| JP | 2006094494 | 4/2006 |
| JP | 2006121612 | 5/2006 |
| JP | 2006134157 | 5/2006 |
| JP | 2007-019959 | 1/2007 |
| JP | 2007148500 | 6/2007 |
| JP | 2007233833 | 9/2007 |
| JP | 2007282158 | 10/2007 |
| JP | 2008085388 | 4/2008 |
| JP | 2008277926 | 11/2008 |
| JP | 2009021962 | 1/2009 |
| KR | 1020040043156 | 5/2004 |
| KR | 1020060068497 | 6/2006 |
| KR | 1020070004202 | 1/2007 |
| WO | 03043308 | 5/2003 |
| WO | 2004063989 | 7/2004 |
| WO | WO2007056459 | 5/2007 |
| WO | 2007093864 | 8/2007 |

OTHER PUBLICATIONS

S. Erturk, "Digital Image Stabilization with Sub-Image Phase Correlation Based Global Motion Estimation", IEEE Transactions on Consumer Electronics, vol. 49, No. 4, pp. 1320-1325, Nov. 2003.
Ko et al., "Digital Image Stabilizing Algorithms Based on Bit-Plane Matching", IEEE Transactions on Consumer Electronics, vol. 44, No. 3, pp. 617-622, Aug. 1998.
Uomori et al., "Electronic Image Stabilization System for Video Cameras and VCRS", J. Soc. Motion Pict. Telev. Eng., vol. 101, pp. 66-75, 1992.
Morimoto et al., "Fast Electronic Digital Image Stabilization for Off-Road Nvigation", Computer Vision Laboratory, Center for Automated Research University of Maryland, Real-Time Imaging, vol. 2, pp. 285-296. 1996.
S. Erturk, "Real-Time Digital Image Stabilization Using Kalman Filters", http://www.idealibrary.com, Real-Time Imaging 8, pp. 317-328, 2002.
Ko et al., "Fast Digital Image Stabilizer Based on Gray-Coded Bit-Plane Matching", IEEE Transactions on Consumer Electronics, vol. 45, No. 3, pp. 598-603, Aug. 1999.
Paik et al., "An Adaptive Motion Decision System for Digital Image Stabilizer Based on Edge Pattern Matching", IEEE Transactions on Consumer Electronics, vol. 38, No. 3, pp. 607-616, Aug. 1992.
"Method of Color Interpolation in a Singe Sensor Color Camera Using Green Channel Seperation" Weerasighe, et al Visual Information Processing Lab, Motorola Austrailian Research Center pp. IV-3233-IV3236, 2002.
Donald D. Spencer, "Illustrated Computer Graphics Dictionary", 1993, Camelot Publishing Company, p. 272.
J. Bolz, P. Schroder; "rapid evaluation of catmull-clark subdivision surfaces"; Web 3D '02 2002.
Duca et al., "A Relational Debugging Engine for Graphics Pipeline, International Conference on Computer Graphics and Interactive Techniques", ACM SIGGRAPH Jul. 2005, pp. 453-463.
gDEBugger, graphicRemedy, http://www.gremedy.com, Aug. 8, 2006, pp. 1-18.
Takeuchi, S., Kanai, T., Suzuki, H., Shimada, K., Kimura, F., Subdivision surface fitting with QEM-basd mesh simplificatio and reconstruction of aproximated B-Spline surfaces, 200, Eighth Pacific Conference on computer graphics and applications pp. 202-2012 2000.
T. DeRose, M., Kass, T. Troung; "subdivision surfaces in character animation"; Jul. 1998; Computer Graphics and Interactive Techniques, Proc; pp. 85-94.
M. Halstead, M. Kass, T. DeRose; "efficient, fair interolation using catmull-clark surfaces"; Sep. 1993; Computer Graphics and Interactive Techniques, Proc; pp. 35-44.
Loop, C., DeRose, T., Generalized B-Spline surfaces o arbitrary topology, Aug. 1990, SIGRAPH 90, pp. 347-356.
Parhami, Computer Arithmetic, Oxford University Press, Jun. 2000, pp. 413-418.
Kuno et al. "New Interpolation Method Using Discriminated Color Correlation for Digital Still Cameras" IEEE Transac. on Consumer Electronics, vol. 45, No. 1, Feb. 1999, Pp. 259-267.
Kumar, S., Manocha, D., Interactive display of large scale trimmed NURBS models, 1994, University of North Carolina at Chapel Hill, Technical Report, p. 1-36.
Krus, M., Bourdot, P., Osorio, A., Guisnel, F., Thibault, G., Adaptive tessellation of connected primitives for interactive walkthroughs in complex industrial virtual environments, Jun. 1999, Proceedings of the Eurographics workshop, pp. 1-10.
Keith R. Slavin; Application As Filed entitled "Efficient Method for Reducing Noise and Blur in a Composite Still Image From a Rolling Shutter Camera"; Application No. 12069669; Filed Feb. 11, 2008.
http://en.wikipedia.org/wiki/Bayer_filter; "Bayer Filter"; Wikipedia, the free encyclopedia; pp. 1-4 2010.
http://en.wikipedia.org/wiki/Colorfilter_array; "Color Filter Array"; Wikipedia, the free encyclopedia; pp. 1-5 2010.
http://en.wikipedia.org/wiki/Color_space; "Color Space"; Wikipedia, the free encyclopedia; pp. 1-4 2010.
http://en.wikipedia.org/wiki/Color_translation; "Color Management"; Wikipedia, the free encyclopedia; pp. 1-4 2010.
http://en.wikipedia.org/wiki/Demosaicing; "Demosaicing"; Wikipedia, the free encyclopedia; pp. 1-5 2010.
http://en.wikipedia.org/wiki/Half_tone; "Halftone"; Wikipedia, the free encyclopedia; pp. 1-5 2010.
http://en.wikipedia.org/wiki/L*a*b; "Lab Color Space"; Wikipedia, the free encyclopedia; pp. 1-4 2010.
J. Stam; "Exact Evaluation of Catmull-clark subdivision surfaces at arbitrary parameter values"; Jul. 1998; Computer Graphics; vol. 32; pp. 395-404.
"A Pipelined Architecture for Real-Time orrection of Barrel Distortion in Wide-Angle Camera Images", Hau, T. Ngo, Student Member, IEEE and Vijayan K. Asari, Senior Member IEEE, IEEE Transaction on Circuits and Sytstems for Video Technology: vol. 15 No. 3 Mar. 2005 pp. 436-444.
"Calibration and removal of lateral chromatic abberation in images" Mallon, et al. Science Direct Copyright 2006; 11 pages.
D. Doo, M. Sabin "Behaviour of recrusive division surfaces near extraordinary points"; Sep. 197; Computer Aided Design; vol. 10, pp. 356-360 Nov. 1978.
D.W.H. Doo; "A subdivision algorithm for smoothing down irregular shaped polyhedrons"; 1978; Interactive Techniques in Computer Aided Design; pp. 157-165.
Davis, J., Marschner, S., Garr, M., Levoy, M., Filling holes in complex surfaces using volumetric diffusion, Dec. 2001, Stanford University, pp. 1-9.
E. Catmull, J. Clark, "recursively enerated B-Spline surfaces on arbitrary topological meshes"; Nov. 1978; Computer aided design; vol. 10; pp. 350-355.
http://Slashdot.org/articles/07/09/06/1431217.html 2007.
http:englishrussia.com/?p=1377 2007.

* cited by examiner

212

METHODS AND DEVICES FOR DEFECTIVE PIXEL DETECTION

FIELD OF INVENTION

Embodiments of the present invention relate to the field of defective pixel detection in digital images. More specifically, embodiments of the present invention relate to a method and system for on-the-fly detection of defective pixels in images processed within a digital camera.

BACKGROUND OF THE INVENTION

Imaging devices such as digital cameras and scanners contain one or more image sensors that are manufactured as CCD (Charge Coupled Device) or CMOS (Complementary Metal-Oxide Semiconductor) devices. The image sensor is composed of an array of sensing pixels that captures energy from an illuminant, often converting this energy into an electric measure such as an intensity value. In most cases, imaging sensors will have a certain number of pixel locations that are "defective" due to fabrication or manufacturing errors. A defective pixel of a sensor is one which when exposed to an illuminant will produce a different intensity value or response than that of a fully functional pixel when exposed to that same illuminant. In other words, a defective pixel is abnormally sensitive or insensitive to light.

Pixel defects can be split into three categories: stuck-at-high, stuck-at-low, and abnormal-response. A stuck-at-high defective pixel is one that always responds to the lighting condition by producing a high intensity value. For instance, if the pixel intensity ranges from 0 (low) to 255 (high), a stuck-at-high pixel may always respond to lighting with a value of 248, for example, even if actual measured intensity for that location of the scene would be 31, 50, 100, etc., if captured by a functional pixel. A stuck-at-low defective pixel is one that always responds to the lighting condition by producing a low intensity value. In the same system, a stuck-at-low defective pixel may respond, for example, with a value of 5 even though a functional pixel would show the intensity value to be 200, 100, 78, etc. A pixel with an abnormal response defect has no absolute, but rather a relative variance from a functional pixel. A pixel with an abnormal response defect will inaccurately respond by a particular percentage, such that, where a functional pixel will read a value X, the abnormal response defective pixel will instead respond with a value of 0.25*X, for example. The abnormal response is thus proportionally higher or lower relative to the intensity being captured. Pixels exhibiting any of these types of defects should, desirably, be corrected or compensated for.

Conventionally, the detection of defective pixels is performed in a controlled environment, such as during sensor fabrication, or during camera initialization while the lens cap is still closed. The identified locations are recorded and then transferred to some non-volatile memory on the device in which the sensor is used, such as on a digital camera. The extra memory requirement adds cost and manufacturing complexity to the whole camera system design.

One method of detecting defective pixels during camera operation applies a statistical analysis technique. In the statistical analysis technique, a defective pixel is detected by a binary hypothesis testing scheme, in which, if the likelihood of P1 hypothesis (pixel belongs to "defective" class) is larger than that of P0 (pixel belongs to "normal" class), the pixel is categorized as "defective." This method does not require memory space to record defective pixel locations, but some offline computation is still required. Additionally, multiple "training" images need to be used to obtain the accumulated likelihood ratio. The selection of the training images needs special care in order to avoid estimation bias.

A more arbitrary way of correcting image defects, which has also been utilized to remove defective pixels during camera operation, is to not detect the defective pixels, but filter out the unknown defects as noise by applying an image-by-image noise removal technique to the entire sensor output (image). The challenge of defective pixel filtering comes from the fact that the distribution of the defective pixels is usually random and the defect locations are usually isolated. Using some form of a linear low pass filter usually does not do well against this type of noise due to its impulse response nature. The result is that a large number of good pixels, or image details, get filtered out along with the bad pixels. The brute-force median or the ranked filter, even though a good solution for salt-and-pepper noise, can unfortunately also filter out image details along with the defects if the filter support is limited.

SUMMARY OF THE INVENTION

Accordingly, a need exists for defective pixel detection methods and devices that can detect localized defects, without requiring large amounts of memory to store data. A need also exists for a defective pixel detection method and system that does not require extensive processing power. A need also exists for defective pixel detection methods and devices that can operate quickly and efficiently within a digital imaging device. A need also exists for methods and devices for detecting defective pixels that integrates with a means for correcting the individual defective pixels. Various embodiments of the present invention, methods and devices for detecting defective pixels, provide these advantages along with other advantages described herein.

Generally, embodiments conceal the defective pixels by a two stage processing. The defective pixels are first detected on-the-fly by a nonlinear process and then corrected by local interpolation. In one example the defective pixels are detected by two rules: (1) if the pixel under consideration, when compared to its surrounding pixels, generates a contrast or modulation that is significantly higher that the resolving power of the lens-sensor system in which the sensor resides; and (2) if the contrast is high along all spatial directions, e.g., the behavior is similar to an impulse response, the pixel is very likely defective.

One embodiment of the present invention is a method of image signal processing. In this embodiment, defective pixels in a digital image representation are determined on-the-fly, based on a comparison of a pixel under evaluation with its surrounding pixels, with reference to a known resolving capability of a lens-sensor arrangement that captured the digital image representation; In response to the determination of defective pixels, the defective pixels are corrected. In one embodiment, a digital image representation in the form of a Bayer pattern array is received. In one embodiment, parameters describing the resolving capabilities of the lens-sensor arrangement are obtained. In one embodiment, an average value is calculated of the same colored pixels surrounding a pixel under evaluation in a portion of a digital image representation. It is then determined if the pixel under evaluation is in a flat image region or an edge image region. In one embodiment, the average value is calculated utilizing a modulation transfer function that is tailored for dark regions of images. In one embodiment, correcting the defective pixels comprises replacing each defective pixel with a replacement pixel comprising an average value of same colored pixels surrounding the defective pixel in a portion of the digital image representation.

In one embodiment of the method for image signal processing, the comparison of a pixel under evaluation to with its surrounding pixels comprises a comparison to a modified modulation transfer function unique to a lens-sensor arrangement used to generate the pixel under evaluation. In one embodiment, the comparison comprises comparing the pixel under evaluation to a modulation transfer function tailored for pixels in flat regions of images if the pixel under evaluation is in a flat image region. In one embodiment, the comparison comprises comparing the pixel under evaluation to a modulation transfer function tailored for pixels in edge regions of images if the pixel under evaluation is in and edge image region. In one embodiment, the method comprises computer-readable code for causing a computer system to perform the method of image signal processing.

According to one embodiment, an image signal processor device comprises a surrounding pixel interpolator, a pixel evaluator, and a pixel replacer. The surrounding pixel interpolator is for calculating an average value of same colored pixels surrounding a pixel under evaluation in a portion of a digital image representation. The pixel evaluator is coupled to the surrounding pixel interpolator. The pixel evaluator is for determining if the pixel under evaluation is defective based on a comparison of the pixel under evaluation with its surrounding pixels, with reference to a known resolving capability of a lens-sensor arrangement. The pixel evaluator is coupled to the pixel replacer. The pixel replacer is configured for replacing each defective pixel with a replacement pixel comprising the average value calculated by the surrounding pixel interpolator.

One embodiment also comprises a pixel location determiner. The pixel location determiner is coupled to the pixel evaluator. The pixel location determiner is for determining if the pixel under evaluation is in a flat image region or an edge image region. One embodiment of the image signal processor device also comprises an image data receiver coupled to the surrounding pixel interpolator. The image data receiver is configured for receiving the digital image representation in the form of a Bayer pattern array. In one embodiment, the surrounding pixel interpolator is configured to calculate the average value utilizing a modulation transfer function that is tailored for dark regions of images. In one embodiment, each replacement pixel comprises the average value of the same colored pixels surrounding the defective pixel in the portion of the digital image representation. In one embodiment, the pixel evaluator is configured for determining if the pixel under evaluation is defective based on a comparison to a modified modulation transfer function unique to the lens-sensor arrangement. In one embodiment, the pixel evaluator is configured to utilize a modulation transfer function tailored for pixels in flat regions of images when evaluating a pixel in a flat image region. In one embodiment, the pixel evaluator is configured to utilize a modulation transfer function tailored for pixels in edge regions of images when evaluating a pixel in an edge image region. One embodiment further comprises a memory element that comprises parameters that represent resolving capabilities of the lens-sensor arrangement.

According to one embodiment of the present invention, the image signal processing device is utilized in a digital imaging device, which also comprises an optical lens and an image sensor in addition to the image signal processor. In one embodiment, the image sensor comprises a Charge Coupled Device (CCD). In one embodiment, the image sensor comprises a Complementary Metal Oxide Semiconductor (CMOS) device.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
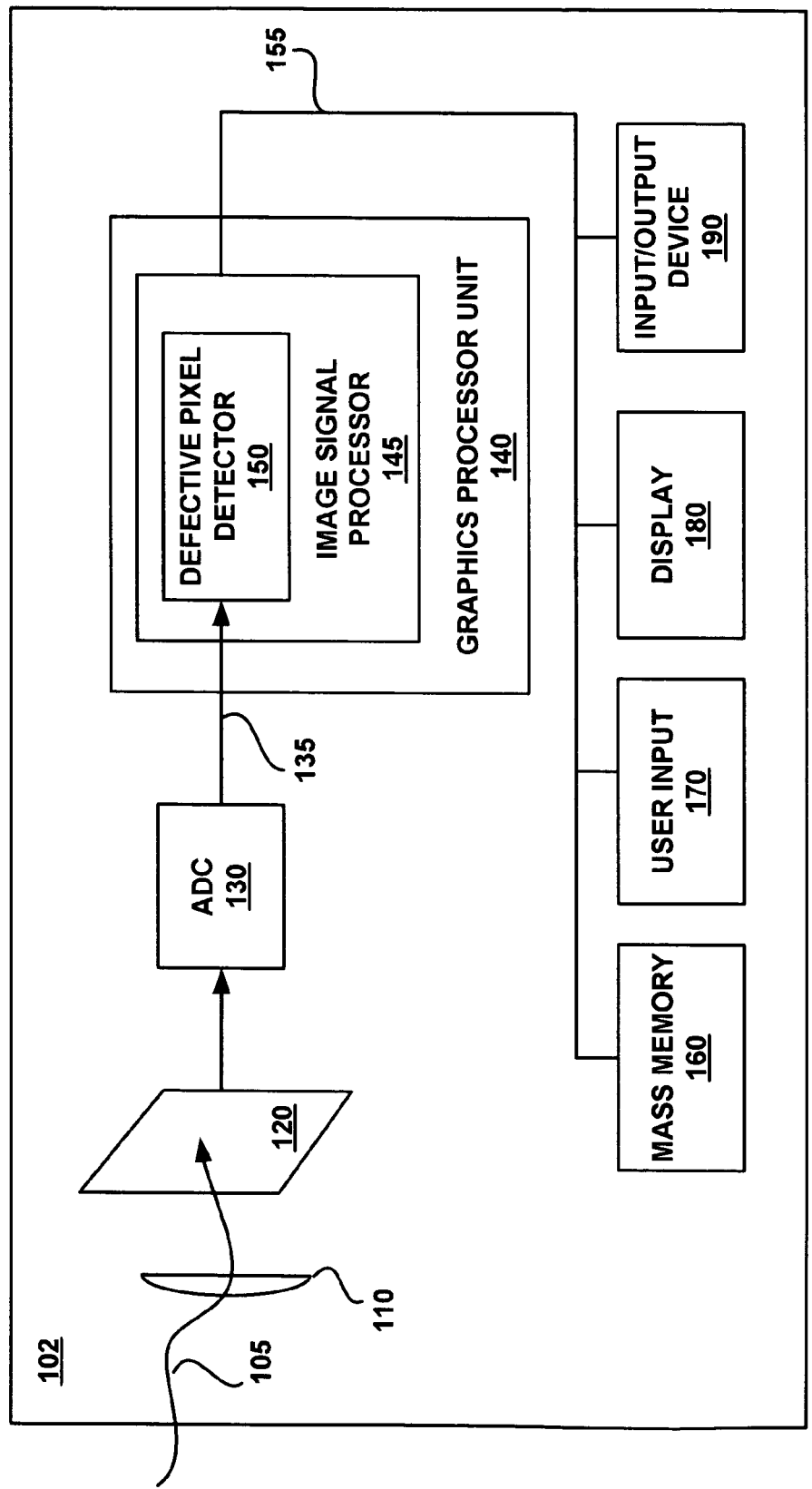
FIG. 1 is a block diagram of an exemplary digital imaging device upon which embodiments of the present invention may be implemented.

Reference will now be made in detail to various embodiments of the invention, methods and devices for defective pixel detection, examples of which are illustrated in the accompanying drawings. While the invention will be described in conjunction with these embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Some portions of the detailed descriptions, which follow, are presented in terms of procedures, steps, logic blocks, processing, and other symbolic representations of operations on data bits that can be performed on computer memory. These descriptions and representations are the means used by those skilled in the image processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. It is appreciated that throughout the present invention, discussions utilizing terms such as "calculating" or "averaging" or "determining" or "receiving" or "evaluating" or "correcting" or "comparing" or "providing" or "replacing" or the like, refer to the action and processes of an electronic system (e.g., digital imaging device 100 of FIG. 1, computer system 212 of FIG. 2, or a similar electronic computing device), that manipulates and transforms data represented as physical (electronic) quantities within the electronic device's registers and memories into other data similarly represented as physical quantities within the electronic device memories or registers or other such information storage, transmission or display devices.

EMBODIMENTS OF THE INVENTION

Various embodiments of the present invention, methods and devices for defective pixel detection, are described herein.

FIG. 1 is a block diagram of an exemplary digital imaging device 100. It is appreciated that digital imaging device 100 described herein illustrates an exemplary configuration of an operational platform upon which embodiments of the present invention can be implemented. Nevertheless, other digital imaging devices with differing configurations can also be used in place of digital imaging device 100 within the scope of the present invention. That is, digital imaging device 100 can include elements other than those described in conjunction with FIG. 1.

Digital imaging device 100 includes an optical lens 110, which transmits an illuminants 105 to an image sensor 120. Image sensor 120 is configured as an array and can be a Charge Coupled Device (CCD), Complementary Metal Oxide Semiconductor (CMOS) imaging device, or the like. Image sensor 120 transmits analog image information via a coupling to analog-to-digital converter (ADC) 130, which can be optional if sensor 120 is capable of outputting a digital image representation. ADC 130 transmits a digital representation of image sensor data via coupling 135 to Graphics Processor Unit (GPU) 140, image signal processor 145, and defective pixel detector 150. In one embodiment the digital representation of image sensor data carried via coupling 135 is a digital image representation in the form of an array of rows and columns of digital data that comprise a pixel array pattern. The present invention is suited to work with an array of pixels received in the form of a Bayer array, a CYMG (Cyan, Yellow, Magenta, Green) array, RGBE (Red, Green, Blue, Emerald) array, 3CCD array (a single array from one of three Charge Coupled Devices that capture the same image), Honeycomb array, or another form of pixel array. By way of explanation, and for simplicity sake, functionality of the present invention is described in conjunction with only one of the arrays, an exemplary Bayer pattern array. It should be appreciated however, that the methods and devices described in the present invention are equally applicable to other pixel array formats such as the CYMG array, the RGBE array, the 3CCD array, the Honeycomb array, and others.

Graphics Processor Unit (GPU) 140 is for processing sounds, still images, moving images, and the like. Image signal processor 145 is for processing raw image data into scan line image data that is then output on signal line 155. In one embodiment, image signal processor 145 detects and corrects defects in the raw image data that is input over line 135. Defective pixel detector 150 is for carrying out a process to detect defective pixels in the digital representation of the image data from sensor 120. The results from defective pixel detector 150 are output over line 155 to image signal processor 145, GPU 140, and other portions of digital imaging device 100. In one embodiment of the present invention, some or all of the functions of defective pixel detector 150, image signal processor 145, and GPU 140 and can be implemented as computer readable code executed within digital imaging device 100, or a like device. In one embodiment of the present invention, some or all of the functions of defective pixel detector 150, image signal processor 145, and GPU 140 and can be implemented in an a digital signal processor chip, an application specific integrated circuit (ASIC), or a like device within digital imaging device 100.

Outputs from defective pixel detector 150, image signal processor 145, and GPU 140 are carried on signal line 155. In one embodiment, signal line 155 can be a computer bus that also allows for user and system inputs to defective pixel detector 150, image signal processor 145, and GPU 140. Optional mass memory 160 is also coupled to signal line 155. Mass memory 160 can be comprised of random access memory, a flash memory type card, a compact flash card, a Secure Digital (SD) card, a MultiMedia Memory Card (MMC), a diskette, a hard disk drive, or the like. In one embodiment, mass memory 160 is removable. Optional user input 170 is also coupled to signal line 155. User input 170 can comprise switches, buttons, joysticks, keyboards, electronic menus, touch pads, or other like means for providing user input to a digital device. In one embodiment, user input 170 can allow for user selection of options in defective pixel detector 150, image signal processor 145, and GPU 140.

Optional display 180 is also coupled to signal line 155. In one embodiment, optional display 155 allows for the display of images and user selectable options. Display 155 can be a liquid crystal display, plasma display, cathode ray tube, or like item for displaying images. Optional input/output device 190 is also coupled to signal line 155. Input/output device 190 can be a standard port such as a Universal Serial Bus (USB) port, or a network adapter port. Digital imaging system 100 can be contained within optional housing 102. In one embodiment, housing 102 can be shaped in the form of a camera body. In such an embodiment, digital imaging device 100 can operate as a digital camera, digital video camera, webcam, or the like. In one embodiment, digital imaging device 100 is in the form of an image scanner. In one embodiment, digital imaging system 100 also comprises a power supply (not shown) such as a battery or an alternating current adapter.

Figure 2:
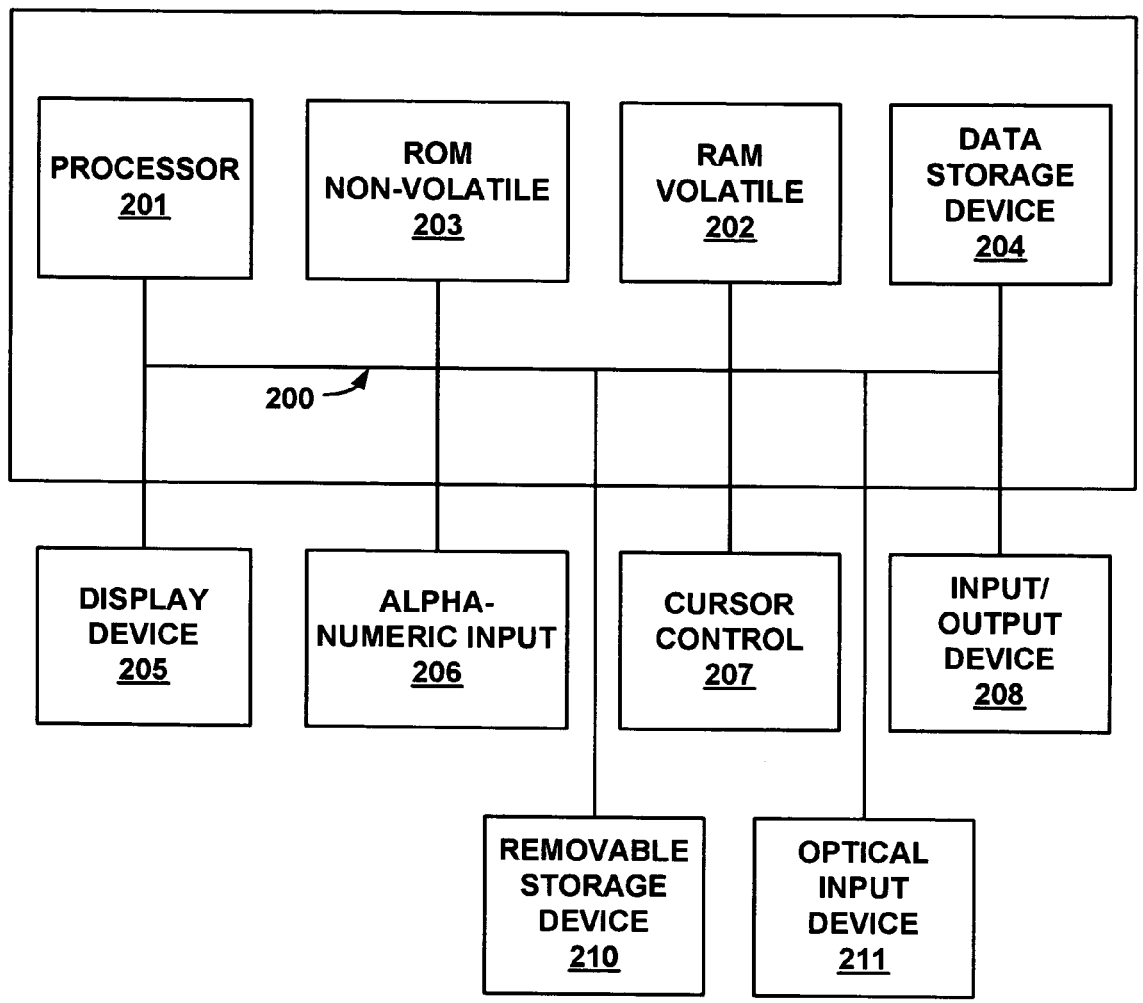
FIG. 2 is a block diagram of an exemplary computer system upon which embodiments of the present invention may be implemented.

In FIG. 2, a block diagram of an exemplary computer system 212 is shown. In one embodiment, a purely software implementation of the present invention can be executed with a computer system such as computer system 212. Computer system 212 can receive live or digitally recorded image data for detection and correction of defective pixels in accordance with the method of the present invention. Image information can be received, for example, from an attached imaging device such as a digital camera, webcam, or scanner, via a data connection or via a removable memory. User inputs such as keyboards and cursor control devices allow user-manipulation of user selectable inputs to the method of detecting and correcting defective pixels of the present invention. It is appreciated that computer system 212 described herein illustrates an exemplary configuration of an operational platform upon which embodiments of the present invention can be implemented. Nevertheless, other computer systems with differing configurations can also be used in place of computer system 212 within the scope of the present invention. That is, computer system 212 can include elements other than those described in conjunction with FIG. 2.

Computer system 212 includes an address/data bus 200 for communicating information, a central processor 201 coupled with bus 200 for processing information and instructions; a volatile memory unit 202 (e.g., random access memory [RAM], static RAM, dynamic RAM, etc.) coupled with bus 200 for storing information and instructions for central processor 201; and a non-volatile memory unit 203 (e.g., read only memory [ROM], programmable ROM, flash memory, etc.) coupled with bus 200 for storing static information and instructions for processor 201. Computer system 212 may also contain an optional display device 205 (e.g. a monitor, projector, or liquid crystal display) coupled to bus 200 for displaying information to the computer user. Moreover, computer system 212 also includes a data storage device 204 (e.g., disk drive) for storing information and instructions.

Also included in computer system 212 is an optional alphanumeric input device 206. Device 206 can communicate information and command selections to central processor 201. Computer system 212 also includes an optional cursor control or directing device 207 coupled to bus 200 for communicating user input information and command selections to central processor 201. Computer system 212 also includes signal communication interface (input/output device) 208, which is also coupled to bus 200, and can be a serial port. Communication interface 208 may also include wireless communication mechanisms. Using communication interface 208, computer system 212 can be communicatively coupled to other computer systems over a communication network such as the Internet or an intranet (e.g., a local area network).

Also included in computer system 212, and coupled to bus 200, is an optional removable storage device 210 such as a flash memory type card, a compact flash card, a Secure Digital (SD) card, a MultiMedia Memory Card (MMC), a diskette, a removable hard disk drive, or the like. Computer system 212 also includes an optional optical input device 211, coupled to bus 200, such as a digital imaging device, a digital camera, a webcam, a video camera, an image scanner, a Charge Coupled Device (CCD), a Complementary Metal Oxide Semiconductor (CMOS) imaging device, or the like.

Figure 3:
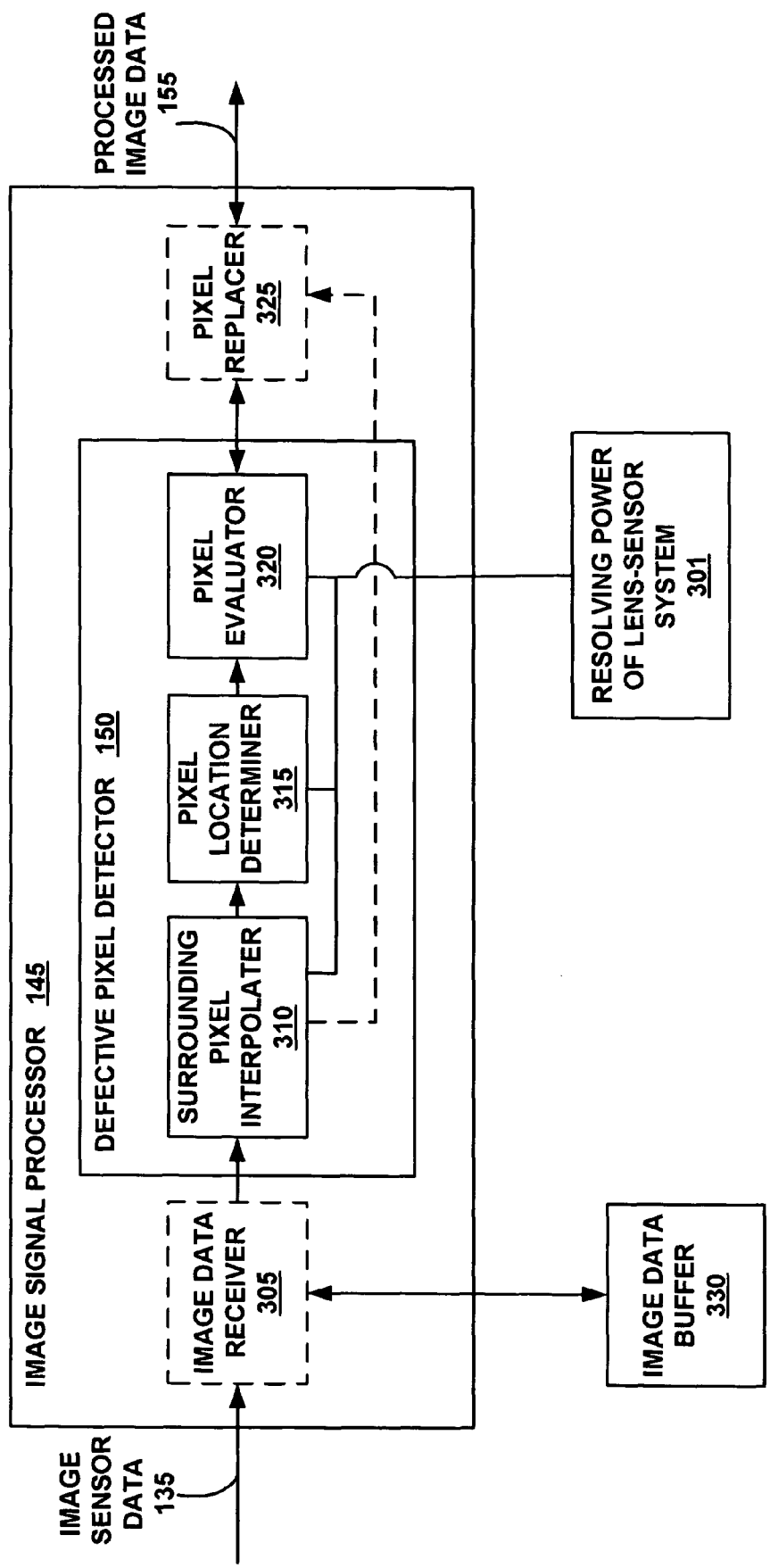
FIG. 3 shows a block diagram of an exemplary image signal processor device according to one embodiment of the present invention.

FIG. 3 shows a block diagram of an exemplary image signal processor 145 according to one embodiment of the present invention. Image signal processor 145 is used for detecting and correcting defective pixels, on the fly by comparing a pixel under evaluation with surrounding pixels, with reference to known capabilities regarding the resolving power of the lens-sensor arrangement used to generate the pixels. Block 301 provides information about the capabilities of the lens-sensor system used to capture image data for processing in image signal processor 145. This information contains parameters in the form of a modulation transfer function or modified modulation transfer functions (discussed later in more detail) for the lens-sensor system. These parameters can be calculated within the image sensing device, but are preferably pre-calculated in a manufacturing or factory type environment and stored for use by image signal processor 145. Block 301 can comprise a memory for storing parameters describing the resolving capability of the lens-sensor in use or a processor for calculating parameters describing the resolving capability of the lens-sensor in use, and can be coupled externally to image signal processor 145 (as shown), or alternatively located within image signal processor 145.

As previously described in conjunction with FIG. 1, portions or all of image signal processor 145 can be implemented in software or hardware. Image signal processor 145 is comprised of an optional image data receiver 305, which is used for receiving digital image data in a scan line fashion, one row of a pixel array at a time. Image data receiver 305 is coupled to image sensor data line 135 for receiving image data, and optionally to an image data buffer 330 for temporarily storing rows of received image data. Image data receiver 305 is also coupled to a defective pixel detector 150, and provides rows of image data to defective pixel detector 150 as required. Defective pixel detector 150 is for detecting defective pixels in streams of image data. Defective pixel detector 150 can be coupled to the optional image data receiver 305, or to image sensor data line 135 if image data receiver 305 is not utilized. Defective pixel detector 150 is also coupled optional pixel replacer 325, or to signal line 155 if pixel replacer 325 is not utilized. Optional pixel replacer 325 is for replacing, with replacement pixels, any defective pixels that are detected by defective pixel detector 150. Pixel replacer 325 is coupled to signal line 155 for output, in scan line fashion, of a digital representation of an image that has had defective pixels detected and replaced.

Defective pixel detector 150 is comprised of a surrounding pixel interpolator 310, a pixel location detector 315, and a pixel evaluator 320. Surrounding pixel interpolator 310 is for determining the average value of the contrast of like colored pixels surrounding a pixel under evaluation. Surrounding pixel interpolator can be coupled to optional image data receiver 305 or to image data sensor line 135 if image data receiver 305 is not used. If an image data receiver is not used, surrounding pixel interpolator performs the functions image data receiver 305. Surrounding pixel interpolator 310 can also optionally be coupled with pixel replacer 325 for providing information about the average value of pixels surrounding a pixel under evaluation. Surrounding pixel interpolator 310 is also coupled with pixel location determiner 315 and pixel evaluator 320. Pixel location determiner 315 is used to determine if a pixel under evaluation is in an edge region or a flat region (not an edge) of a digital image representation. Pixel location determiner 315 is coupled to pixel evaluator 320. Pixel evaluator 320 serves to evaluate whether or not a pixel under evaluation is defective or not by making a comparison to a modified modulation transfer function. Pixel evaluator 320 can be coupled to optional pixel replacer 325 for replacing a detected defective pixel, or if pixel replacer 325 is not used, to signal line 155 for output of information regarding defective pixels.

Modulation transfer function parameters can be utilized in surrounding pixel interpolator 310, pixel location determiner 315, and pixel evaluator 320. These modulation transfer function parameters can be generated within the system that image signal processor 145 is part of, or can be pre-calculated, stored for use, and provided via a link the parameters. For instance, surrounding pixel interpolator 310, pixel location determiner 315, and pixel evaluator 320 are shown coupled to block 301 to obtain parameters regarding the resolving capabilities of the lens-sensor utilized to generate the pixels being processed.

Image data receiver 305 is coupled to image sensor data line 135 for receiving image data, and optionally to an image data buffer 330 for temporarily storing rows of received image data. Image data is received as a digital image representation in the form of scan lines, or rows in a pixel array. In one embodiment, the pixel array can be in the form of a Bayer pattern. In other embodiments of the present invention, image data is receives as a digital image in the form of a CYMG array, a RGBE array, a 3CCD array, a Honeycomb array, or some other form of array. In an embodiment utilizing a Bayer patter pixel array, if image data buffer 305 is used, it is of sufficient size to buffer a minimum of four rows of data from the largest Bayer pixel array that can be sent from sensor 120 (FIG. 1) or ADC 130 (FIG. 2) over signal line 135. If other pixel array patterns are used, the minimum size will be dependent up on the number of lines of data needed to begin processing. If an input data buffer is not used, image data receiver 305 also performs the functions of image data buffer 330 in addition to its other functions.

Figure 4:
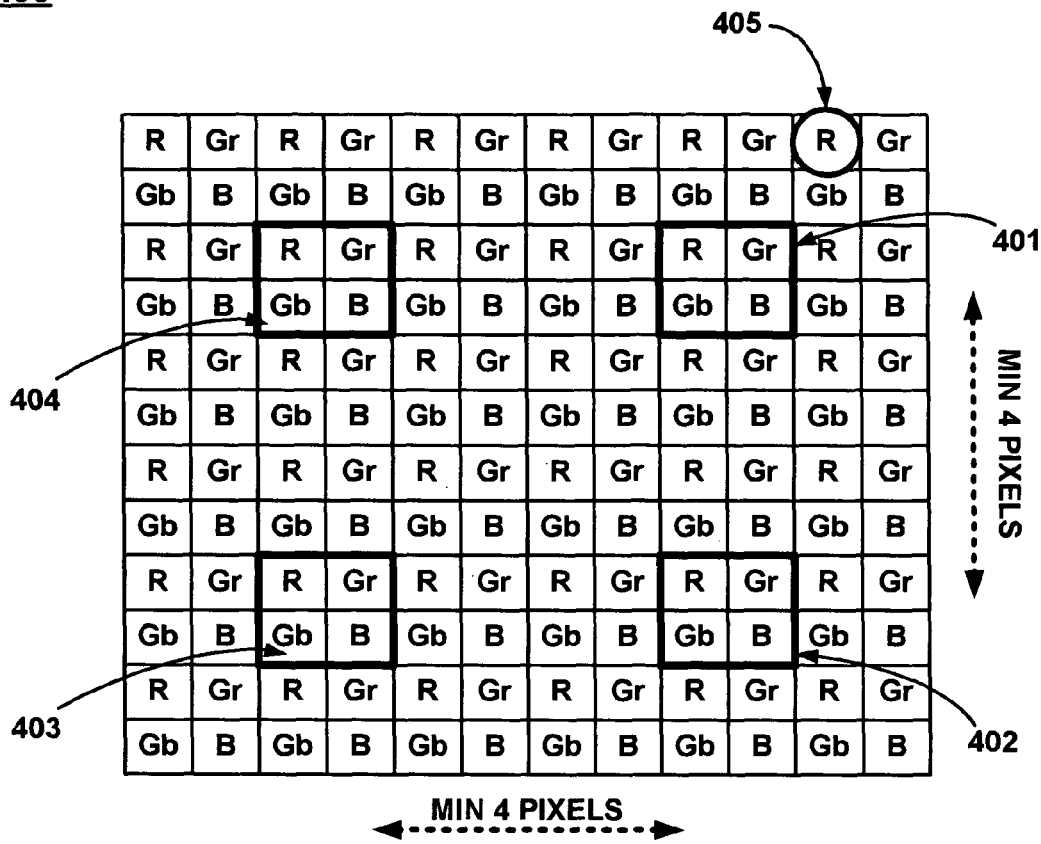
FIG. 4 shows a depiction of an exemplary Bayer pixel array upon which embodiments of the present invention may be implemented.

FIG. 4 shows a depiction of an exemplary Bayer pixel array 400 upon which embodiments of the present invention may be implemented. Bayer pixel array 400 is shown with twelve rows and twelve columns, but can be smaller or much larger. Pixels of four different colors (color channels) are represented by different letters such as; "R," "B," "Gr," and "Gb." The term pixel as used in the descriptions of the present invention, refers to a single color unit of a single color channel, such as pixel 405 that is circled in array 400. The pixels are arranged in a specific order in Bayer pixel array 400 such that only two of the four colors appear in any row or column, and those two colors of pixels repeatedly alternate such that two pixels the same color, such as "R," are only separated by one pixel of another color, in any horizontal, vertical, or diagonal direction. Areas 401, 402, 403, and 404 represent two-by-two pixel clusters of four different colors of pixels that are separated from each other by a minimum of four pixels in every horizontal, vertical, and diagonal direction.

Referring again to FIG. 3, surrounding pixel interpolator 310 is for determining the average value of the contrast of like colored pixels that surround a pixel under evaluation in a pixel array. In one embodiment of the present invention, surrounding pixel interpolator 310 is used to evaluate a Bayer pattern array of pixels. In other embodiments, surrounding pixel interpolator 310 is used to evaluate pixel arrays in other formats, such as a CYMG array, RGBE array, 3CCD array, Honeycomb array, or some other form of array.

Figure 5:
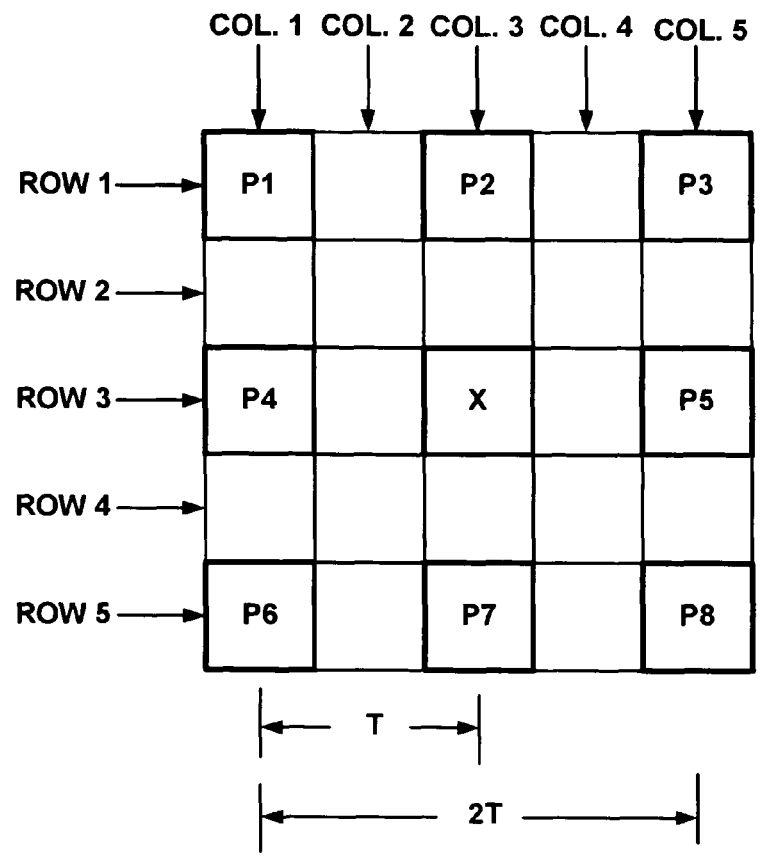
FIG. 5 shows a depiction of an array of like colored pixels surrounding a pixel under evaluation, according to one embodiment of the present invention.

FIG. 5 shows a depiction of an array 500 of like colored pixels (P1-P8) surrounding a pixel under evaluation "X," according to one embodiment of the present invention. Array 500 is a five row (Row 1-Row 5) by five column (Col. 1-Col. 5) subset of a Bayer pixel array, such as Bayer pixel array 400. Pixel "X" and P1 through P8 are of like color, as can be seen from their placement in the pixel array 500. P1 through P8 are the nearest pixels of like color that surround pixel "X" in the horizontal, vertical, and diagonal direction in array 500. An array such as array 500 is normally received from an image sensor (such as sensor 120) or an analog-to-digital converter (such as ADC 135) in scan line fashion, one row at a time. For instance, all of the pixels in Row 1 would be received first, then the pixels in Row 2, then the pixels in Row 3, then the pixels in Row 4, and finally the pixels in Row 5. Each pixel is received digitally and has a certain period associated with the period of its sample. This period is shown by the "T" and "2T" demarcations below array 500. As represented, pixel "X" is in a flat image region, or better put, not on an edge region of an image. If pixel "X" were on an edge region of a representation of image data, up to two rows and/or columns could be missing from array 500. For instance, in a worst-case edge region scenario where Row 1, Row 2, Col. 1, and Col. 2 are missing from the array, pixel "X" is now in the upper left corner of the array, and is only surrounded on three of eight sides by pixels of like color, namely P5, P7, and P8. Many other edge region arrangements are possible where pixel "X" is in the corner of an array, or else an edge crosses through the five-by-five pixel array normally surrounding pixel "X."

Referring again to surrounding pixel interpolator 310 of FIG. 3 and also to FIG. 4, the average image contrast value is calculated for like colored pixels surrounding pixel "X," which is under evaluation, in each horizontal, vertical, and diagonal direction. In one embodiment of the present invention, this average value can be calculated for P1 through P8, the like colored pixels surrounding "X" in array 500, with an equation such as the equation shown in Table 1.

TABLE 1

Exemplary Equation for Average Value of Pixel Contrast $$\text{Avg} = \left(\sum_{i=1}^{8} \text{Pi}\right) / 8$$

After the average (Avg) value for the surrounding pixels is calculated, surrounding pixel interpolator 310 also calculates the minimum derivative among the eight possible directions from "X," to find out how much the contrast of pixel "X" differs from the contrast of its surrounding like colored pixels. In one embodiment of the present invention, this minimum derivative between pixel "X" and P1 through P8 can be calculated with an equation such as the equation shown in Table 2.

TABLE 2

Exemplary Equation for Minimum Derivative $$D_{min} = \min_{i=1\sim8} |Pi - X|$$

Surrounding pixel interpolator 310 passes information about "Avg" and "$D_{min}$" along to pixel location determiner 315 and pixel evaluator 320. In one embodiment, information about the "Avg" is also coupled to optional pixel replacer 325.

Pixel location determiner 315 is used to determine if a pixel under evaluation is in an edge region or a flat region (not an edge) of a digital image representation. To do this some sort of edge detection is applied to pixel "X" (FIG. 5) under evaluation, and the surrounding like colored pixels, P1 through P8 (also shown in FIG. 5). Edge detection takes place to reduce the number of false positives among the defective pixels that are detected by pixel evaluator 320. By knowing whether a pixel "X" is in an edge region or has an edge region intruding on the five by five pixel array that surrounds it, pixel evaluator 320 can take into account the location of the pixel under evaluation when performing calculations to determine if it is defective. Tables 3 and 4 show a set of two exemplary equations that can be used in combination to determine if a pixel under evaluation is in a flat region of image data, or an edge region of image data. In other embodiments of the present invention, other means of edge detection besides those shown in Tables 3 and 4 can also be used.

TABLE 3

Exemplary Equation for Maximum Contrast Derivative $$C_{max} = \max_{i=1\sim8} |Pi - \text{Avg}|$$

The equation of Table 3 is used to determine "$C_{max}$," or the maximum contrast derivative away from the "Avg" contrast of the pixels P1 through P8, which was calculated from the formula in Table 1. The value for "$C_{max}$" is carried forward by pixel location determiner 315 and used in an edge detection equation such as the exemplary equation shown in Table 4.

In the equation shown in Table 4, the value of "$C_{max}$" is taken from the equation of Table 3, the value of Avg is taken from the equation of Table 1, and the value of "$L_{flat}\%$" is taken from an adjusted modulation transfer function that is calculated for the lens/sensor arrangement utilized to capture pixel "X," the pixel under evaluation. If the result of the equation of Table 4 is found to be true, then the five by five pixel area surrounding pixel "X," is considered to be in a flat image region. If the result of the equation is false, then it is assumed that there is an image edge somewhere within the five by five pixel region surrounding pixel "X." Information about whether a pixel under evaluation is in a flat region or an edge region of an image representation is forwarded on to pixel evaluator 320.

TABLE 4

Exemplary Equation for Edge Detection $$\frac{C_{max}}{\text{Avg}} \leq L_{flat}\%$$

Figure 6:
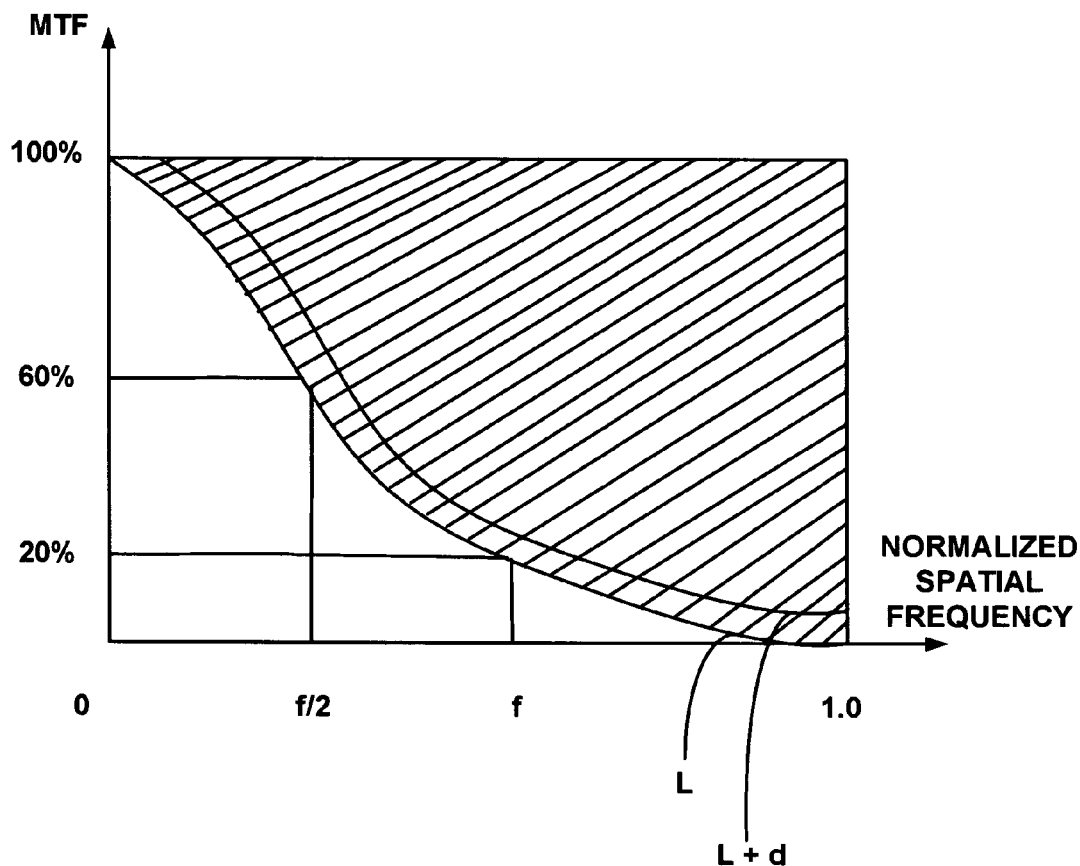
FIG. 6 shows an exemplary graph of a modulation transfer function according to one embodiment of the present invention.

FIG. 6 shows an exemplary graph 600 of a modulation transfer function according to one embodiment of the present invention. Modulation transfer functions are used to describe how many image details and how much sharpness a particular lens-camera or lens-sensor arrangement can provide as compared to the amount of detail and sharpness in an actual image. Modulation transfer functions are well known in the art of imaging, and are normally calculated in a lab or factory type setting so that a frequency response capability for a lens-sensor arrangement can be known. The X-axis of graph 600 represents normalized spatial frequency in units such as line pairs per millimeter. The Y-axis of graph 600 represents a contrast response in percentage of achievable contrast (ranging from 0% to 100%).

In FIG. 6, curved line "L" represents the response of the lens-sensor arrangement, and is the actual graph of the modulation transfer function. The shaded area to the right of "L" represents contrast that is beyond the capability of the lens-sensor arrangement. The un-shaded area to the left of "L" represents contrast that is achievable with the lens-sensor arrangement. The curved line "L+d" represents an adjusted modulation transfer function with a pre-set tolerance factor "d" added in to adjust for noise. Different such tolerance factors can be added in manufacture, test, or assembly to alter the actual modulation transfer function for use in certain non-ideal real-world situations. For instance, a small tolerance, "d," of a few percent may be added to L to achieve a value "$L_{flat}$," for use when determining the maximum contrast of a pixel in a flat region of an image. A larger tolerance, "d," of for instance 10% may be added to L to achieve a value "$L_{edge}$," for use when determining the maximum contrast of a pixel in an edge region of an image. Finally, a very large tolerance, "d," of for instance 80% may be subtracted from "L" to achieve a value, "$L_{dark}$," for use when determining the maximum contrast of a pixel in an image taken in low light conditions, thus giving a value of "$L_{dark}$" that represents only 20% of the dynamic range of the lens-sensor arrangement.

Values for "$L_{flat}$," "$L_{edge}$," and "$L_{dark}$" are assigned to a lens-sensor arrangement in a factory, lab, assembly stage, or like setting, and are utilized by image signal processor 145 and defective pixel detector 150 (both shown in FIGS. 1 and 3). In some embodiments of the present invention, the constant values of "d" used to create to "$L_{flat}$," "$L_{edge}$," and "$L_{dark}$" may be user alterable via user input such as user input 170 (FIG. 1).

Referring again to FIG. 3, pixel evaluator 320 serves to evaluate whether or not a pixel under evaluation is defective or not by making a comparison to a modified modulation transfer function such as "$L_{flat}$" or "$L_{edge}$." Table 5 shows an exemplary equation for evaluating a pixel in a flat image region to determine if it will be classified as defective. The value of "Avg" is taken from the equation shown in Table 1, the value of "$D_{min}$" is taken from the equation shown in Table 2. Both the values of "Avg" and "$D_{min}$" are forwarded from surrounding pixel interpolator 310. The adjusted modulation transfer function value for the frequency (1/T) of pixel "X" under evaluation is "$L_{flat}\%$" as determined from a graph or equation for an adjusted modulation transfer function, such as graph 600. If the result of the comparison done via the equation of Table 5 is true, then pixel "X" under evaluation is considered a defective pixel. Pixel evaluator 325 forwards information about a pixel determined as defective to optional pixel replacer 325, or if pixel replacer 325 is not utilized, onward for other uses via signal line 155.

TABLE 5

Exemplary Equation for Determining if a Pixel in a Flat Region is Defective $$\frac{D_{min}}{\text{Avg}} > L_{flat}\%$$

Likewise, Table 6 shows an exemplary equation for evaluating a pixel in an edge image region to determine if it will be classified as defective. The value of "Avg" is taken from the equation shown in Table 1, the value of "$D_{min}$" is taken from the equation shown in Table 2. Both the values of "Avg" and "$D_{min}$" are forwarded from surrounding pixel interpolator 310. The adjusted modulation transfer function value for the frequency (1/T) of pixel "X" under evaluation is "$L_{edge}\%$" as determined from a graph or equation for an adjusted modulation transfer function, such as graph 600. If the result of the comparison done via the equation of Table 6 is true, then pixel "X" under evaluation is considered a defective pixel. Pixel evaluator 325 forwards information about a pixel determined as defective to optional pixel replacer 325, or if pixel replacer 325 is not utilized, onward for other uses via signal line 155.

TABLE 6

Exemplary Equation for Determining if a Pixel in an Edge Region is Defective $$\frac{D_{min}}{\text{Avg}} > L_{edge}\%$$

Defective pixel detector 150 evaluates each pixel in an image stream successively, on-the-fly, as received. A determination is made as to whether a pixel is defective based on the pixel's modulation as compared to its surrounding pixels being higher than the resolving power of the lens-sensor system used to generate it. The simplicity of the calculations involved reduces the processing power needed to identify bad pixels, and increases the speed of detection. Because of the need for information about surrounding pixels, some small buffering capability for a minimum number of data rows of an array is required. For instance, in an embodiment of the present invention that evaluates a Bayer pattern array of pixels, a buffering capacity for four rows of the Bayer pixel array, beyond the row currently being received, is required to ensure enough information exists for evaluating the received pixels. If this buffering capability is not provided via image data receiver 305 or image data buffer 305, it is provided by or accessed from within defective pixel detector 150. The procedure used by defective pixel detector 150 detects "isolated" defective pixels. The eight same-color pixels (for example P1 through P8 of FIG. 5) surrounding the evaluated pixel must not be defective, which means the minimal distance between two defective pixels on the same color channel is four pixels apart. The defective pixels of different color channels, on the other hand, can be adjacent to each other, since there is no cross-color information used in the proposed procedure. That is, the present invention can detect and correct two-by-two bad pixel clusters. FIG. 4 illustrates four examples of two-by-two bad pixel clusters (401, 402, 403, and 404) and their minimum distances from one another.

Optional pixel replacer 325 is for replacing, with replacement pixels, any defective pixels that are detected by defective pixel detector 150. Pixel replacer 325 is coupled to signal line 155 for output, in scan line fashion, of a digital representation of an image that has had defective pixels detected and replaced. Many methods of generating a replacement pixel may be utilized. To saving on memory and processing power, the current invention replaces a pixel that has been evaluated as defective with an average value of the same colored pixels (P1 through P8 of FIG. 5) that surrounded the evaluated pixel. This "Avg" can be recalculated using an equation such as the equation shown in Table 1, or simply supplied through some coupling to surrounding pixel interpolator 310. Once the defective pixels in an image stream have been replaced, an image stream is output in scan line fashion from pixel replacer 325 via signal line 155.

In one embodiment of the present invention, a modification can be made to increase noise tolerance in low light level regions of images. By doing this, the modulation transfer function is no longer utilized in some low light scenarios by portions of defective pixel detector 150. Table 7 shows an equation that can be used to replace the equation of Table 1. This equation adds an extra step as compared to the equation of Table 1, and thus returns as "Avg," the greater of the average value of P1 through P8, or the value of "$L_{dark}$" for pixel "X," which is under evaluation. If the default value of "$L_{dark}$" is ever returned as "Avg," then if the defective pixel evaluator 150 reverts to a previously known method for determining defective pixels, such as utilizing a low pass filter, instead of using pixel location determiner 315 and pixel evaluator 320. Pixels marked as defective are passed on via signal line 155 or to optional pixel replacer 325, which operates in the same fashion as previously described.

TABLE 7

Exemplary Equation for Average Value of Pixel Contrast, Optimized for Noise Tolerance in Dark Image Regions $$Avg = \max\left[\left(\sum_{i=1}^{8} Pi\right) / 8, L_{dark}\right]$$

Figure 7:
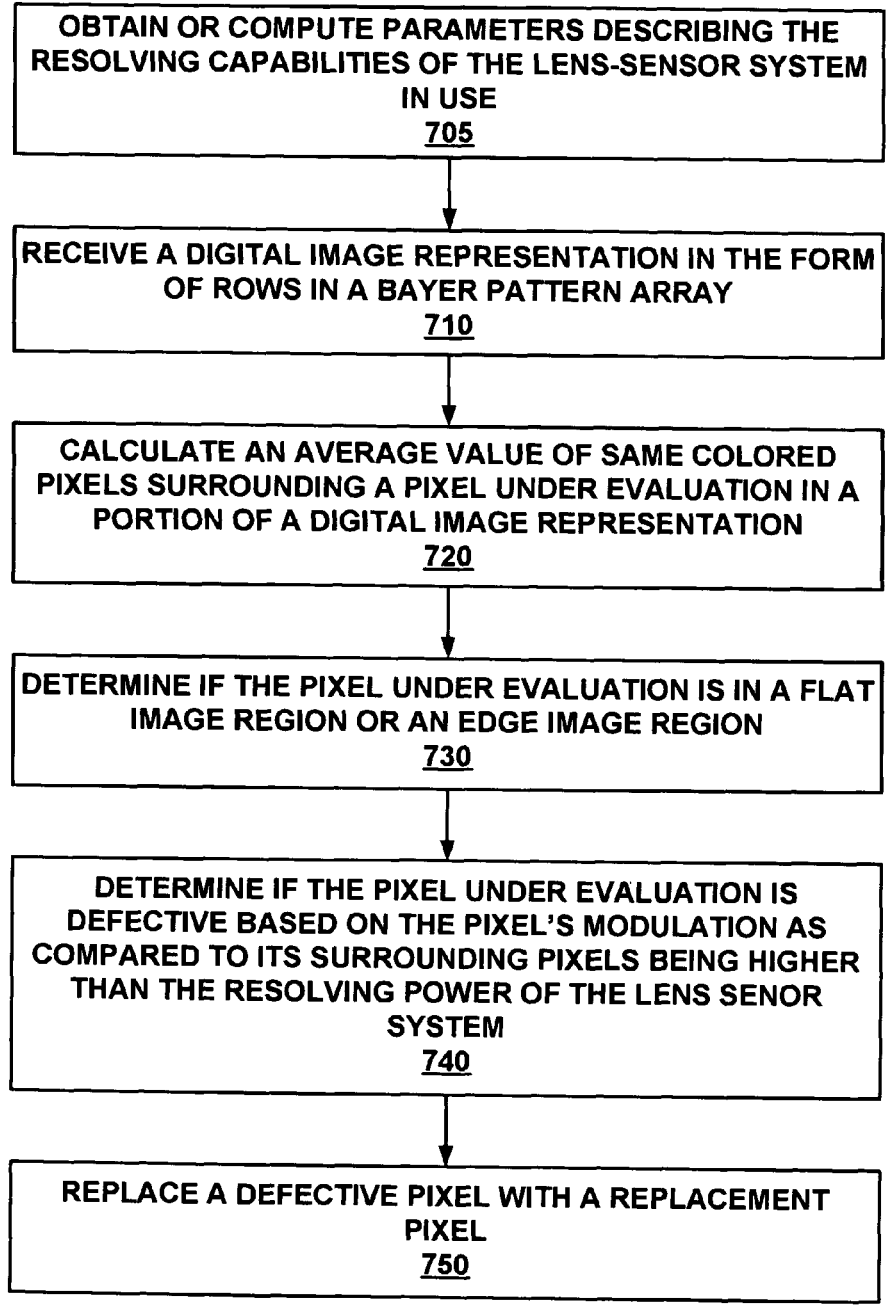
FIG. 7 shows a flowchart of a computer-controlled method for detecting and correcting a defective pixel in accordance with one embodiment of the present invention.

FIG. 7 shows a flowchart 700 of a computer-controlled method for detecting and correcting a defective pixel in accordance with one embodiment of the present invention. Although specific steps are disclosed in flowchart 700, such steps are exemplary. That is, embodiments of the present invention are well suited to performing various other (additional) steps or variations of the steps recited in flowchart 700. It is appreciated that the steps in flowchart 700 may be performed in an order different than presented, and that not all of the steps in flowchart 700 may be performed. In one embodiment, flowchart 700 is implemented as computer-readable program code stored in a memory unit of computing device such as computer system 212 (FIG. 2) or digital imaging device 100 (FIG. 1), and executed by processor 201 (FIG. 1), image signal processor 145 (FIG. 2), or a like device.

In FIG. 7, in one embodiment of the present invention, 705 of flowchart 700 shows obtaining or computing parameters describing the resolving capabilities of the lens-sensor system in use. This function is provided for and described in conjunction with block 301 of FIG. 3. It includes obtaining or computing parameters such as the modulation transfer function for the lens-sensor arrangement that is being used to generate the pixels that are being evaluated. It also includes obtaining or computing parameters such as modified modulation transfer functions tailored for flat image regions, edge image regions, or dark image regions. If this information is pre-calculated, it can be provided as required to the image signal processor stages via memory, otherwise it can be calculated using known and described methods.

In one embodiment of the present invention, 710 of flowchart 700 shows that a digital image representation is received in the form of rows in a Bayer pattern array. In other embodiments of the present invention, a digital image representation is received as an array of pixels in the form of a CYMG array, RGBE array, 3CCD, Honeycomb array, or some other form of array. This receiving of a digital image representation is described in conjunction with image data receiver 305 (FIG. 3), image data buffer 330 (FIG. 3), defective pixel detector 150 (FIGS. 1 and 3), and surrounding pixel interpolator 310 (FIG. 3).

In one embodiment of the present invention, 720, of flowchart 700 shows that an average value of same colored pixels surrounding a pixel under evaluation in a portion of a digital image representation is calculated. This calculating of an average value corresponds to the descriptions given in conjunction with FIG. 5, surrounding pixel interpolator 310 (FIG. 3), and the equations shown and described in conjunction with Table 1 and Table 7. In some embodiments, this calculation of the average value is done utilizing a modulation transfer function that is tailored for dark regions of images.

In one embodiment of the present invention, 730 of flowchart 700 shows determining if the pixel under evaluation is in a flat image region or an edge image region. This flat/edge determination corresponds to the descriptions of the equations shown in Tables 3 and 4, and also corresponds to the descriptions given in conjunction with FIG. 5 and pixel location determiner 315 (FIG. 3).

In one embodiment of the present invention, 740 of flowchart 700 shows determining if the pixel under evaluation is defective based on the pixel's modulation as compared to its surrounding pixels being higher than the resolving power of the lens-sensor system used to generate the pixel. This defective pixel determination corresponds to the descriptions given in conjunction with pixel evaluator 320 (FIG. 3), and the equations shown and described in conjunction with Tables 1, 2, 5 and 6. Additionally, in some embodiments, where the pixel under evaluation is in suitably dark image region, and the equation of Table 7 is used to calculate the "Avg" value of pixels surrounding the pixel under evaluation, a method such as a low pass filter can also be used to evaluate for defective pixels. In one embodiment, information regarding the average value of same colored pixels surrounding the pixel under evaluation and information about the minimum derivative between the pixel under evaluation and its surrounding like colored pixels is utilized in the determination. In one embodiment, information about whether the pixel is in an edge region or a flat region of an image is also used, so that a modulation transfer function tailored for edge image regions or flat image regions, as appropriate, can be utilized in the determination.

In one embodiment of the present invention, 750 of flowchart 700 shows replacing a defective pixel with a replacement pixel. Generation of a replacement pixel and replacement of a pixel that has been evaluated as defective are both described in conjunction with pixel replacer 325 (FIG. 3), and further in conjunction with the descriptions of the equations of Tables 1 and 7. In one embodiment, a defective pixel is replaced with a pixel of average value as calculated by the equation of Table 1. In one embodiment, a defective pixel can also be replaced with a pixel of average value as calculated by the equation of Table 7.

Various embodiments of the invention, methods and devices for defective pixel detection, are thus described. While the present invention has been described in particular embodiments, it should be appreciated that the invention should not be construed as limited by such embodiments, but rather construed according to the below claims.

What is claimed is:

1. A method of image signal processing for a digital imaging device comprising:
   determining, in an electronic system, defective pixels on-the-fly in a digital image representation based on a comparison of a contrast of a pixel under evaluation with a contrast of its surrounding pixels, with reference to a known resolving capability of a lens-sensor arrangement that captured said digital image representation, wherein said determining includes:
      if said pixel under evaluation is in a flat image region, increasing said known resolving capability by a first percentage,
      if said pixel under evaluation is in an edge image region, increasing said known resolving capability by a second percentage greater than said first percentage, and
      if said digital image representation is captured in a low light level condition, decreasing said known resolving capability by a third percentage greater than said second percentage; and
   in response to said determination correcting said defective pixels.

2. The method of image signal processing of claim 1 further comprising receiving said digital image representation in the form of a Bayer pattern array.

3. The method of image signal processing of claim 1 further comprising obtaining parameters describing the resolving capabilities of said lens-sensor arrangement.

4. The method of image signal processing in claim 1 further comprising:
   calculating an average value of same colored pixels surrounding said pixel under evaluation in a portion of said digital image representation; and
   determining if said pixel under evaluation is in said flat image region or said edge image region.

5. The method of image signal processing of claim 4 wherein said average value is calculated utilizing a modulation transfer function that is tailored for dark regions of images.

6. The method of image signal processing of claim 1 wherein said correcting said defective pixels comprises replacing each said defective pixel with a replacement pixel comprising an average value of same colored pixels surrounding said defective pixel in a portion of said digital image representation.

7. The method of image signal processing of claim 1 wherein said comparison comprises a comparison to a modified modulation transfer function unique to said lens-sensor arrangement.

8. The method of image signal processing of claim 7 wherein said comparison comprises comparing said pixel under evaluation to a modulation transfer function tailored for pixels in flat regions of images if said pixel under evaluation is in said flat region.

9. The method of image signal processing of claim 7 wherein said comparison comprises comparing said pixel under evaluation to a modulation transfer function tailored for pixels in edge regions of images if said pixel under evaluation is in said edge region.

10. An image signal processor device for a digital imaging device comprising:
    a surrounding pixel interpolator for calculating an average value of same colored pixels surrounding a pixel under evaluation in a portion of a digital image representation;
    a pixel evaluator coupled to said surrounding pixel interpolator, said pixel evaluator for determining if said pixel under evaluation is defective based on a comparison of a contrast of said pixel under evaluation with a contrast of its surrounding pixels, with reference to a known resolving capability of a lens-sensor arrangement that captured said digital image representation, if said pixel under evaluation is in a flat image region, said known resolving capability is increased by a first percentage, if said pixel under evaluation is in an edge image region, said known resolving capability is increased by a second percentage greater than said first percentage, and if said digital image representation is captured in a low light level condition, said known resolving capability is decreased by a third percentage greater than said second percentage; and
    a pixel replacer coupled to said pixel evaluator, wherein said pixel replacer is configured for replacing each defective pixel with a replacement pixel comprising said average value calculated by said surrounding pixel interpolator, and wherein said pixel replacer is coupled to a memory component.

11. The image signal processor device of claim 10 further comprising a pixel location determiner coupled to said pixel evaluator, said pixel location determiner for determining if said pixel under evaluation is in said flat image region or said edge image region.

12. The image signal processor device of claim 10 further comprising an image data receiver coupled to said surrounding pixel interpolator, wherein said image data receiver is configured for receiving said digital image representation in the form of a Bayer pattern array.

13. The image signal processor device of claim 10 further comprising a memory element that comprises parameters that represent resolving capabilities of said lens-sensor arrangement.

14. The image signal processor device of claim 10 wherein said surrounding pixel interpolator is configured for calculating said average value utilizing a modulation transfer function that is tailored for dark regions of images.

15. The image signal processor device of claim 10 wherein said pixel evaluator is configured for determining if said pixel under evaluation is defective based on a comparison to a modified modulation transfer function unique to said lens-sensor arrangement.

16. The image signal processor device of claim 15 wherein said pixel evaluator is configured to utilize a modulation transfer function tailored for pixels in flat regions of images when said pixel under evaluation is in said flat image region.

17. The image signal processor device of claim 15 wherein said pixel evaluator is configured to utilize a modulation transfer function tailored for pixels in edge regions of images when said pixel under evaluation is in said edge image region.

18. A digital imaging device comprising:
   an optical lens;
   an image sensor coupled to said lens, said image sensor for capturing a digital image representation; and
   an image signal processor coupled to said image sensor, said image signal processor comprising:
      a surrounding pixel interpolator for calculating an average value of same colored pixels surrounding a pixel under evaluation in a portion of said digital image representation;
      a pixel evaluator coupled to said surrounding pixel interpolator, said pixel evaluator for determining if said pixel under evaluation is defective based on a comparison of a contrast of said pixel under evaluation with a contrast of its surrounding pixels, with reference to a known resolving capability of a lens-sensor arrangement that captured said digital image representation, if said pixel under evaluation is in a flat image region, said known resolving capability is increased by a first percentage, if said pixel under evaluation is in an edge image region, said known resolving capability is increased by a second percentage greater than said first percentage, and if said digital image representation is captured in a low light level condition, said known resolving capability is decreased by a third percentage greater than said second percentage; and
      a pixel replacer coupled to said pixel evaluator, wherein said pixel replacer is configured for replacing each defective pixel with a replacement pixel comprising said average value calculated by said surrounding pixel interpolator.

19. The device of claim 18 further comprising a pixel location determiner coupled to said pixel evaluator, said pixel location determiner for determining if said pixel under evaluation is in said flat image region or said edge image region.

20. The device of claim 18 further comprising an image data receiver coupled to said surrounding pixel interpolator, wherein said image data receiver is configured for receiving said digital image representation in the form of a Bayer pattern array.

21. The method of image signal processing of claim 1 wherein said contrast of said surrounding pixels comprises an average contrast of like colored pixels surrounding said pixel under evaluation.

* * * * *